US011198196B2

(12) United States Patent
Elhadj et al.

(10) Patent No.: US 11,198,196 B2
(45) Date of Patent: Dec. 14, 2021

(54) SYSTEM AND METHOD FOR MODIFYING MATERIAL SURFACE

(71) Applicant: Lawrence Livermore National Security, LLC, Livermore, CA (US)

(72) Inventors: Selim Elhadj, Livermore, CA (US); Jae Hyuck Yoo, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 567 days.

(21) Appl. No.: 15/927,465

(22) Filed: Mar. 21, 2018

(65) Prior Publication Data

US 2019/0291210 A1 Sep. 26, 2019

(51) Int. Cl.
| | | |
|---|---|---|
| B23K 26/342 | (2014.01) | |
| G02F 1/135 | (2006.01) | |
| G02F 1/1333 | (2006.01) | |
| G02B 27/28 | (2006.01) | |

(Continued)

(52) U.S. Cl.
CPC .......... B23K 26/342 (2015.10); B23K 26/032 (2013.01); B23K 26/064 (2015.10); B23K 26/0608 (2013.01); B23K 26/0626 (2013.01); B23K 26/0676 (2013.01); B23K 26/0869 (2013.01); B33Y 10/00 (2014.12); B33Y 30/00 (2014.12); G02B 27/283 (2013.01); G02F 1/135 (2013.01); G02F 1/133362 (2013.01); B23K 26/702 (2015.10)

(58) Field of Classification Search
CPC .............. B23K 26/342; B23K 26/3568; B23K 26/352; B23K 26/354; B23K 26/064;

(Continued)

(56) References Cited

U.S. PATENT DOCUMENTS

| 2005/0038663 A1* | 2/2005 | Brotz | G10L 21/06 704/277 |
| 2012/0099035 A1* | 4/2012 | Burgess | G02F 1/1354 349/25 |

(Continued)

FOREIGN PATENT DOCUMENTS

GB 2471949 A 1/2011

OTHER PUBLICATIONS

John Heebner, "Diode-based additive manufacturing of metals using an optically-addressable light valve", published 2017 (Year: 2017).*

(Continued)

*Primary Examiner* — Phuong T Nguyen
*Assistant Examiner* — Bonita Khlok
(74) *Attorney, Agent, or Firm* — Harness, Dickey & Pierce, P.L.C.

(57) ABSTRACT

The present disclosure relates to a method of modifying a surface of a material, in situ, while the material is being used to at least one of form or modify a portion of a part to remove flaws layer-by-layer and improve a part from a layerwise built, or a coating. The method may involve generating first, second and third beams. The third beam may act on a surface of a material to heat a portion of the surface of the material into a flowable state to thus modify a surface characteristic of the material. The first beam may control an optically addressable light valve (OALV) which modifies an energy of the third beam. The second beam may control an optically addressable electric field modulator (OAEFM) to generate an electric field in a vicinity of the surface and to influence a movement of the portion of material while the portion of material is in the flowable state. The beams are modulated based on a sensing element feedback loop.

16 Claims, 2 Drawing Sheets

Figure 1:
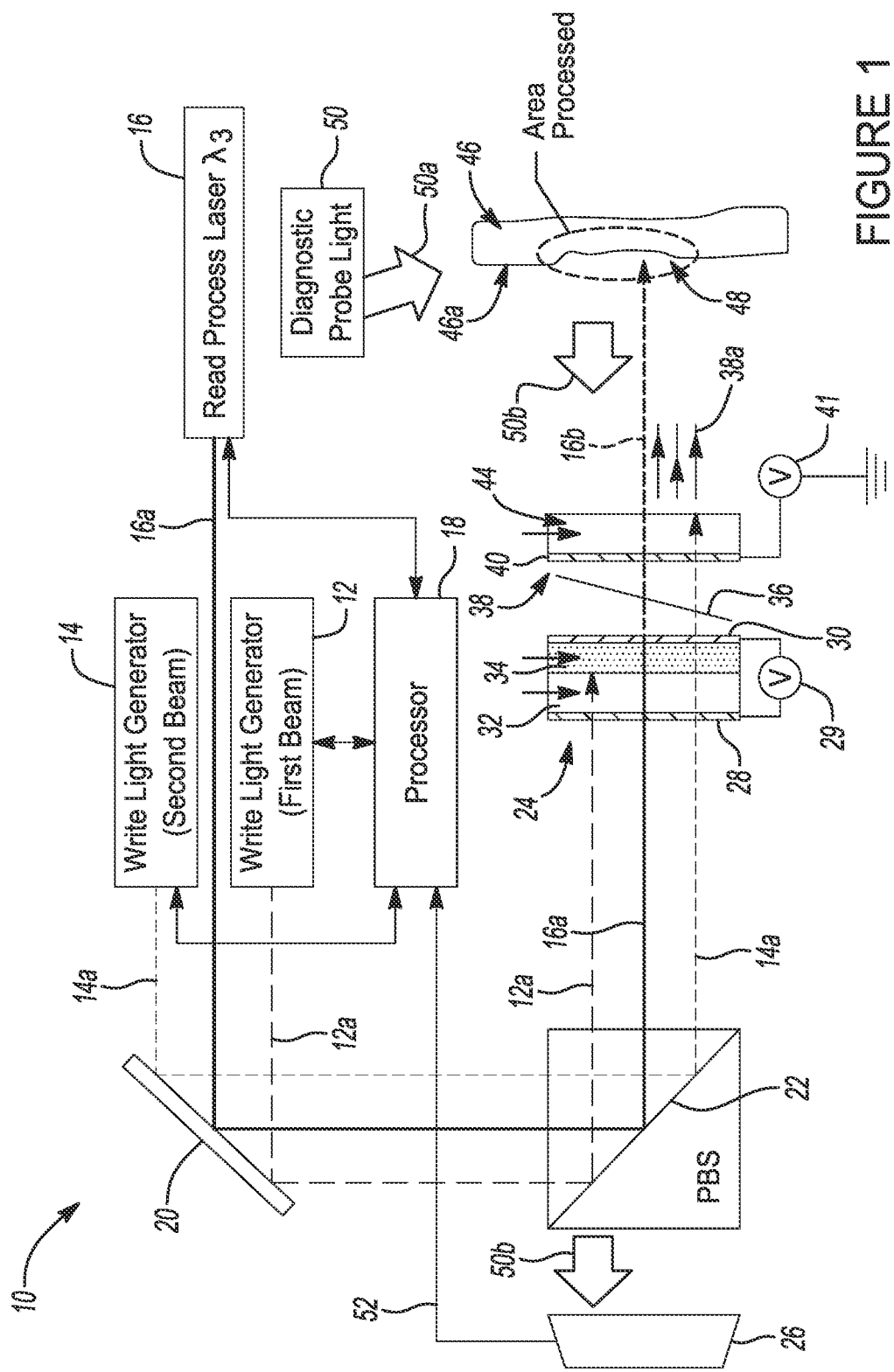

(51) Int. Cl.

| | |
|---|---|
| *B33Y 10/00* | (2015.01) |
| *B33Y 30/00* | (2015.01) |
| *B23K 26/06* | (2014.01) |
| *B23K 26/064* | (2014.01) |
| *B23K 26/08* | (2014.01) |
| *B23K 26/03* | (2006.01) |
| *B23K 26/067* | (2006.01) |
| *B23K 26/70* | (2014.01) |

(58) Field of Classification Search
CPC .............. B23K 26/032; B23K 26/0604; B23K 26/0608; B23K 26/0626; B33Y 10/00; B33Y 30/00; G02B 27/283; G02F 1/135; G02F 1/133362; G05B 2219/49018; B29C 64/386
USPC ..... 219/76.1, 121.6; 438/940, 942; 359/238, 359/246, 251, 248, 255, 281, 284, 294
See application file for complete search history.

(56) References Cited

U.S. PATENT DOCUMENTS

2017/0232557 A1* 8/2017 DeMuth .................. B28B 1/001
  148/525
2018/0326664 A1* 11/2018 DeMuth ................ B29C 64/268

OTHER PUBLICATIONS

Geoffrey Morrison, "Why lasers are the future (of projectors)", published 2015 (Year: 2015).*

Burgess, C. D. Optically Addressed Light Valve. 2016.

Efron, U.; Wu, S. T.; Owechko, Y.; Lacoe, R. C.; Welkowsky, M. S.; Bates, T. D.; Grinberg, J., Liquid crystal light valves: A review of recent studies. Ferroelectrics 1987, 73 (1), 315-328.

Flannery, J. B., Light-Controlled Light Valves. IEEE Trans. Electron Devices 1973, Ed20 (11), 941-953.

Hayasaki, Y.; Tamura, Y.; Yamamoto, H.; Nishida, N., Spatial property of formed patterns depending on focus condition in a two-dimensional optoelectronic feedback system. Japanese Journal of Applied Physics Part 1—Regular Papers Short Notes & Review Papers 2001, 40 (1), 165-169.

Heebner, J.; Borden, M.; Miller, P.; Hunter, S.; Christensen, K.; Scanlan, M.; Haynam, C.; Wegner, P.; Hermann, M.; Brunton, G.; Tse, E.; Awwal, A.; Wong, N.; Seppala, L.; Franks, M.; Marley, E.; Williams, K.; Budge, T.; Henesian, M.; Stolz, C.; Suratwala, T.; Monticelli, M.; Walmer, D.; Dixit, S.; Widmayer, C.; Wolfe, J.; Bude, J.; McCarty, K.; DiNicola, J. M., Programmable Beam Spatial Shaping System for the National Ignition Facility. High Power Lasers for Fusion Research 2011, 7916.

Herrington, M.; Daly, K.; Buchnev, O.; D'Alessandro, G.; Kaczmarek, M., AC-field-enhanced beam coupling in photorefractive, hybrid liquid crystals. Epl 2011, 95 (1).

Marinova, V.; Chi, C. H.; Tong, Z. F.; Liu, R. C.; Berberova, N.; Lin, S. H.; Lin, Y. H.; Stoykova, E.; Hsu, K. Y., Liquid crystal light valve operating at near infrared spectral range. Optical and Quantum Electronics 2016, 48 (4).

Matthews, M. J.; Guss, G.; Drachenberg, D. R.; Demuth, J. A.; Heebner, J. E.; Duoss, E. B.; Kuntz, J. D.; Spadaccini, C. M., Diode-based additive manufacturing of metals using an optically-addressable light valve. Opt. Express 2017, 25(10), 11788-11800.

* cited by examiner

SYSTEM AND METHOD FOR MODIFYING MATERIAL SURFACE

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to layerwise additive systems and methods, and more particularly to a manufacturing system and method which is able to dynamically detect, planarize, correct and/or modify, in situ, a surface of a part being manufactured, or a coating being formed on an existing part.

BACKGROUND

This section provides background information related to the present disclosure which is not necessarily prior art.

Additive manufacturing involves the buildup, layer-by-layer (i.e., typically one layer at a time), to produce 3D parts, or to produce a coating on a part. Additive manufacturing has become a highly important manufacturing technology in many industries. The as-coated parts, or the as-built part layers, often include defects that may compromise the overall part performance or part coating. This shortcoming could be addressed to improve the part's performance if the defect(s) could be corrected or removed, especially in situ, before the defect(s) is/are trapped or included within the bulk (i.e., interior area) of the part.

It is also understood that additively manufactured parts are sometimes post-processed to achieve full density and/or to remove or relax residual stress within the finished part. However, the parts may still fail or crack before the post-process mitigation is applied to remove residual stress, or to remove microstructural defects such as voids within the part. Even minor physical handling of a part, before the post-process mitigation is applied, can sometimes cause a crack or otherwise compromise the mechanical properties of the part, or possible worsen an existing defect to the point where the post-processing defect mitigation operation becomes more challenging.

There are also applications where it is desired to create or modify a surface feature on a layer being formed, or to modify a surface of a coating being applied to an existing part or structure. For example, planarization (i.e., flattening) of a surface of a structural layer or a surface of a coating is sometimes desired, or alternatively adding a surface feature(s) to an otherwise planar surface may be desired. With present day manufacturing processes, it is challenging to perform such surface structuring on a layer or coating surface, in situ, in real time.

The ability to dynamically correct defects, or to modify a surface of a layer or coating, in situ, during a layer-wise additive manufacturing process or during a coating process, depends on access to the processed areas, and more particularly on having an effective and practical means for correction, removal or mitigation of defects, or modification of a surface topology. However, suitable means to address such manufacturing and/or additive layer-by-layer coating process defects, or to carry out the above described surface modifications, in situ, has heretofore not been available.

SUMMARY

This section provides a general summary of the disclosure, and is not a comprehensive disclosure of its full scope or all of its features. In one aspect the present disclosure relates to a method of modifying a surface of a material, in situ, while the material is being used to at least one of form or modify a portion of a part or coating. The method may comprise generating a first beam, generating a second beam and generating a third beam. The third beam may be for acting on a surface of a material to heat a portion of the surface of the material into a flowable state to modify a surface characteristic of the material. The first beam may be used to control an optically addressable light valve (OALV), where the OALV is controlled to modify an energy of the third beam. The second beam may be used to control an optically addressable electric field modulator (OAEFM), where the OAEFM is controlled to generate an electric field in a vicinity of the surface and to influence a movement of the portion of material while the portion of material is in the flowable state.

In another aspect the present disclosure relates to a method of modifying a surface of a material, in situ, while the material is being used to at least one of form or modify a portion of a part or coating. The method may comprise using a first optical beam generator to generate a first beam at a first wavelength; using a second optical beam generator to generate a second beam at a second wavelength; and using a third optical beam generator to generate a third beam. The third beam may act on a surface of a material to heat a portion of the surface of the material into a flowable state to modify a surface characteristic of the material. The first beam may be used to control an optically addressable light valve (OALV), where the OALV is controlled to modify an energy of the third beam. The second beam may be used to control an optically addressable electric field modulator (OAEFM), where the OAEFM is controlled to generate an electric field in a vicinity of the surface of the material and to influence a movement of the portion of material while the portion of material is in the flowable state. A processor may also be used to control the first and second beam generators.

In still another aspect the present disclosure relates to a system for modifying a surface of a material, in situ, while the material is being used to at least one of form or modify a portion of a part or coating. The system may comprise a first beam generator which generates a first optical beam; a second beam generator which generates a second optical beam; and a third beam generator which generates a third optical beam. The third optical beam acts on a surface of a material to heat a portion of the surface of the material into a flowable state to modify a surface characteristic of the material. An optically addressable light valve (OALV) may be included which is controlled by the first optical beam to modify an energy of the third optical beam. An optically addressable electric field modulator (OAEFM) may also be included which is controlled by the second optical beam to generate an electric field in a vicinity of the surface. The electric field influences a movement of the portion of material while the portion of material is in the flowable state.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
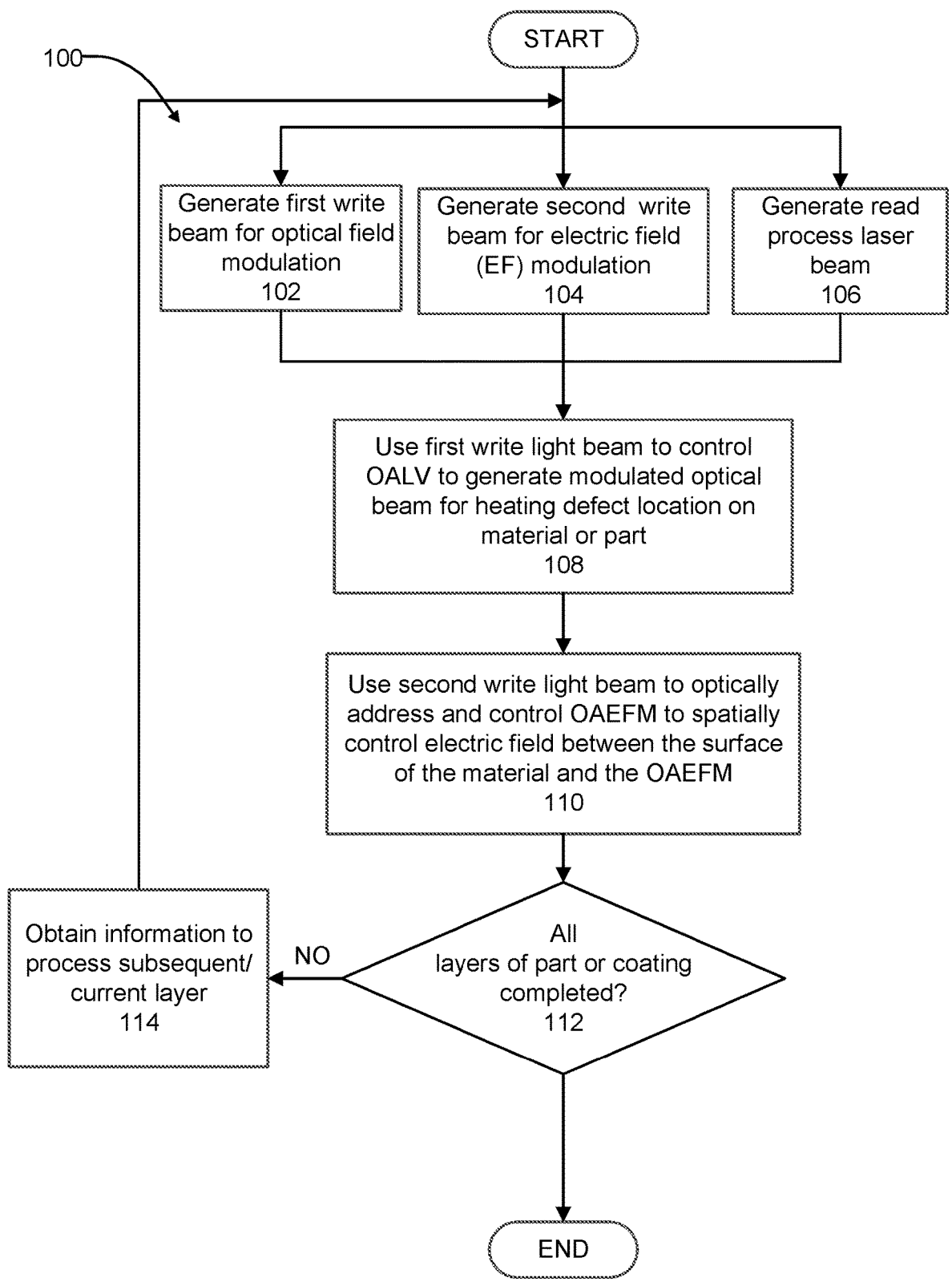

Corresponding reference numerals indicate corresponding parts throughout the several views of the drawings, wherein:

FIG. 1 is a high level schematic diagram of one embodiment of a system in accordance with the present disclosure to achieving in situ modification of a surface of a material during a manufacturing process or a coating process; and FIG. 2 is a high level flowchart illustrating various operations that may be performed by the system of FIG. 1 in remediating or modifying a surface profile or topology of a material.

DETAILED DESCRIPTION

Example embodiments will now be described more fully with reference to the accompanying drawings.

Referring to FIG. 1, one embodiment of a system 10 is shown in accordance with the present disclosure for addressing defects in an additive manufacturing process or additive coating process in situ. The system 10 is able to remove defects and/or to improve/correct a surface profile using surface shaping and localized surface defect removal based on real time feedback from a dynamic surface properties sensing element. The feedback enables real time in situ correction of surface profiles and parts flaws or defects which arise during layer-by-layer creation (i.e., additive manufacturing) of a part, or during application of a coating to an existing part, or during final surface finishing of a part or a coating.

The system 10 shown in FIG. 1 may include a first write light (i.e., optical) beam ($\lambda_1$) generator 12 for generating a first light beam 12a for spatial optical field modulation ("OFM"), a second write light (i.e., optical) beam generator 14 ($\lambda_2$) for generating a second light beam 14a for spatial electric field modulation ("EFM"), and a third beam generator in the form of a read process laser 16 ($\lambda_3$) for generating a third light (i.e., optical) beam 16a. The first and second write light beam generators 12 and 14 in this example are each formed by lasers, and each of the write light beam generators 12, 14 and the read process laser 16 are in bi-directional communication with an electronic processor 18.

The light beam 12a, light beam 14a and light beam 16a from the first write light beam generator 12, the second write light beam generator 14 and the read process laser 16, respectively, may all be directed at and reflected by a mirror 20 to a polarizing beam splitter ("PBS") 22, and then from the PBS 22 to an optically addressable light valve ("OALV") 24. A portion of the optical beams impinging the PBS 22 may be directed to an optional sensing element 26, and may be used by the sensing element 26 to provide a corresponding electrical feedback signal to the processor 18, as will be discussed further in the following paragraphs.

The OALV 24 may include a pair of transparent electrodes 28 and 30, with a first photoconductor 32, tuned to $\lambda_1$, and a twisted nematic liquid crystal (or non-linear liquid crystal) 34 disposed between the electrodes. The OALV 24 is modulated by the electric field applied across the photoconductor 32 and the liquid crystal 34 layers using the pair of electrically biased transparent electrodes 28 and 30, along with a voltage source 29 for applying a voltage bias between them. A cross-polarizer 36 is disposed downstream of the OALV 24 and upstream of an optically addressed electric field modulator ("OAEFM") 38. The cross-polarizer 36 is present to ultimately spatially modulate the process (i.e., Read) beam 16a intensity based on the polarization state of that beam as dictated by the OALV 24 polarization modulation. The OAEFM 38 may be formed by a single transparent electrode 40 on the beam input surface of a second photoconductor 44. A voltage source 41 may provide a voltage bias signal to the electrode 40. The second photoconductor 44 may be tuned to $\lambda_2$ and positioned adjacent to the electrode 40. The electrode 40 in this example is at a different voltage or potential than a material 46 being processed by the system 10, and therefore direct electrical contact with the material 46 is not necessary to affect the part or coating processed. In this example material 46 has a topological defect area 48 on a surface 46a thereof, which can be planarized (flattened) using the system 10. The material 46 may be a part under construction using an additive manufacturing layer-by-layer process, or the material 46 may simply be a layer or surface coating on an already formed part, where the layer or surface coating is being created through one or more iterative material deposition operations.

The first photoconductor 32 of the OALV 24 is sensitive to a given range of wavelengths from a secondary light source, i.e., the first write beam 12a, that reduces the photoconductor resistivity according to the intensity of the incident light.

The read light 16a (or process light) from read process laser 16 is processed to form a polarized laser beam by polarizing beam splitter 22, and is then amplitude modulated using the cross-polarizer 36. The OALV 24 thus acts as a spatial light modulator ("SLM") to spatially modulate the amplitude of the read process beam 16a using the cross-polarizer assembly consisting of the PBS 22, and the polarizer 36. The spatial modulation is achieved by using the first write beam 12a to control the two-dimensional (2D) beam shaping resulting in 2D beam heating of the material 46. The beam 16a is shaped according to the pattern illuminating the OALV 24 from the write light beam 12a to form modulated beam 16b. The two dimensional beam shaping induces controlled, localized heating at the defect area 48 using the modulated beam 16b to melt a highly localized portion of the material 46. This enables modification of the surface 46a profile or topology, for example to correct a defect in the surface 46a by planarization (i.e., by surface flattening), or to create a surface feature on the surface 46a of the material 46.

The OALV 24 is combined with use of the OAEFM 38 to further induce localized movement of molten or flowable conductive material (ex. metals) which is in response to a spatially (2D) modulated electric field, indicated by field lines 38a in FIG. 1. The OAEFM 38 effectively consists of an OALV but without the photorefractive liquid crystal layer, its only purpose is to independently modulate the electric field 38a and to control its action/effect on the molten material being processed. As a result, the OAEFM 38 is photosensitive to a different range of wavelengths from that of the OALV 24. The specific range of wavelengths to which the OAEFM 38 is responsive to may be achieved by the selected bandgap or dopants of the particular photoconductor 44 used in the OAEFM 38, for example. As a result, the light sensitivity of each photoconductor 32 and 44 in the OALV and OAEFM, respectively, are independent of each other, and independent electric field 38a and beam 16b exposure maps can be applied to the processed surface 46a of the material 46. In this example the material 46 is a metallic material which has been locally heated by the OALV 24 into a molten or flowable state. However, the material need not be strictly a magnetic or conductive material, but could be a mixture of non-metallic (e.g., plastic) and metallic material.

The OAEFM 38, which lacks the photorefractive element of the OALV 24 (e.g., liquid crystals or non-linear crystal), is also optically addressed via control signals applied to it by the processor 18 using the second write beam 14a, and modulates the electric field 38a only between the surface 46a and the EFM 38. This electric field 38a modulation is used to induce localized, forced movement of the molten or flowable material at the defect area 48, and thus achieve the desired (or target) planarization of a surface or surface structuring (shaping or surface feature creation) as dictated by the processor 18 to further modify the surface 46a profile before the molten material fuses back into a non-flowable state upon read process laser 16 turn off.

The system 10 may be used to locally induce material flow at the defect area 48 to achieve a number of different objectives or types of correction. For example, the induced, localized material flow may be used to correct structural and microstructural defects of the surface 46a. The corrections may include planarization, filling voids, or correcting any other type of defect which can be thermally, optically, and electrically corrected. Surface defects can also include impurities, material phase impurities, voids, un-even surface areas, high residual stress areas, structural microstructural defects, layer or coating thickness variations, and so on. The system 10 may further make use of a surface diagnostic or characterization tool for mapping and monitoring the layer or surface properties of interest to identify defects for correction one layer at a time, or directly on a coating(s). The beam shaping and induced heating can itself also limit the occurrence of defects, such as residual stress, before the defects occur based on process knowledge of the material's behavior under 2D beam heating conditions.

For conductive materials such as metals or metal composites, the combination and simultaneous superposition of optical beam induced melting, together with the action of an applied electric field, allows material to flow controllably sideways or upwards under the application of a localized electric field (EF) bias (V). This use of a controlled electric field to act on the molten material can thus, for e.g., move material from an area with excessive material volume to an area with a void to compensate and planarize the surface. With a suitable thickness sensor, profilometry, or imaging system the entire surface 46a of the material 46 can thus be planarized. Furthermore, with other forms of suitable material properties sensing devices, detected defects can be ablated, for example to remove impurities, annealed (e.g., to remove localized stress), or thermally processed to induce spatially or controllably graded surface modifications. These device-driven modifications can thus be induced to produce a more homogenous surface, coating or part or, conversely, to introduce functionally graded materials where properties, such as surface structure, can be tuned arbitrarily within selected areas of the part.

Also, under the pulling action of an applied electric field, the beam-induced melt pool of material of the material 46 can be made to rise above the surface 46a over length scales on the order of the beam heating foot print, and be frozen in space by rapid cooling following beam heating shutoff. Such structured arrays structures can be applied arbitrarily over the entire surface 46a of the material 46. Importantly, the system 10 allows improvement in the quality and performance of additively manufactured parts, and mitigation post processing of surface or coating defects.

Optionally, as shown in FIG. 1, a diagnostic probe light 50 may be used to illuminate the surface 46a with a signal 50a, which enables an optical feedback signal 50b to be created when signal 50a is reflected off of the surface 46a. By "feedback signal" it is meant that the signal 50a is modified by the surface 46a in terms of its intensity and/or spatial distribution, to create the optical feedback signal 50b. The optical feedback signal 50b may be reflected from the surface 46a back towards the sensing element 26 and collected by the sensing element. The sensing element 26 may then generate an electrical feedback signal 52 which is applied to the processor 18. The electrical feedback signal 52 enables the processor 18 to apply real time control over the OALV 24 and the OAEFM 38 during the manufacturing operation being performed on the material 46. The feedback signal and sensing elements may also include spectroscopy for chemical or stress analysis as routinely performed in Raman Spectroscopy measurements. Other optical means of defect and layer properties probing (layer thickness, refractive index, etc.), such as scanning ellipsometry can also be used to monitor the process.

Referring to FIG. 2, a flowchart 100 is shown that illustrates major operations performed by the system 10 of FIG. 1. At operations 102, 104 and 106 the first write beam, the second write beam and the read process laser beam are formed, respectively. At operation 108 the first write beam 12a is used to control the OALV 24, which enables the OALV to control the intensity of the read process beam 16a. At operation 110 the second write beam 14a is used to control the OAEFM 38, which enables the OAEFM to spatially control the electric field 38a between the surface 46a of the material 46 and the OAEFM 38. At operation 112 a check is made by the processor 18 to determine if all layers of the part being manufactured (or coating being formed/modified) are completed. If not, then operation 114 may be performed to obtain information for creating, processing or modifying the currently processed layer or next layer of the part or coating, and operations 102-112 may be repeated. If the check at operation 112 indicates that all layers have been completed, then the method may end.

The system 10 and its method of operation as described herein may be applied to coatings, surfaces, or final additively manufactured parts for structural and microstructural improvements. The improvements may relate to improving, for example, flatness, or to reduce roughness, to correct surface roughness or to impart surface features to the profile or topology of the surface 46a of the material 46. On large areas or on thin coatings especially, defects such as microscopic pits or bumps in the surface 46a would be difficult to remove by using etching, polishing or micro-machining techniques because these methods are subtractive, and thus not particularly efficient. Such traditional methods as etching and polishing also add complexity to the system, can add significant processing time, and can sometimes necessitate the use of additional materials, or taking the part out of the process. In the proposed method materials can be removed from areas where excess material is present to nearby areas where material is lacking to cover, for e.g., voids or gaps in the layer, or to adjust thickness to produce a more uniform coating thickness over all relevant length scales on the part. Finally, the system 100 and method described herein can also be used to intentionally introduce specific surface features on a material surface by locally melting, manipulating the molten material with the electric field, and then freezing the molten material in place by turning off the laser heating. Such surface structuring may impart optical and/or adhesion functionalities, including but not limited to when spatially graded structures are produced by varying a characteristic of the structure along its surface.

The system 10 and method disclosed herein may also be used to remove localized impurities in a surface (e.g., phase or chemical), as well assisting with laser ablating or annealing. The system 10 and method may induce structured arrays on surfaces (e.g., rod, lines, etc.) by freezing in place molten material attracted to or repulsed with the electric field modulation. The system 10 and method may also produce graded surface structuring to impart optical adhesion functionality to a structure. The system 10 and method may use combinations of photoconductors with engineered and tuned bandgap or optically active elements that respond independently to a combination of write (modulation) light wavelengths.

It will also be appreciated that the system 10 and method may include reflective OALV or OAEFM components instead of transmissive components. The system 10 may, as noted herein, be used without the OAEFM 38 and may be used to treat surfaces besides metallic surfaces, such as non-metallic surfaces where only the OALV 24 is used to address specific surface defects where electric field modulation is not needed, and/or to induce localized melting of a surface area to planarize the surface.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method of modifying a surface of a material, in situ, while the material is being used to at least one of form or modify a portion of a part or coating, the method comprising:
   generating a first beam having a first wavelength;
   generating a second beam having a second wavelength different from the first wavelength;
   generating a third beam for acting on a surface of a material to heat a portion of the surface of the material into a flowable state to modify a surface characteristic of the material;
   the second beam being generated independently from the first and third beams;
   using the first beam to control an optically addressable light valve (OALV), the OALV being controlled to modify an energy of the third beam; and
   using the second beam to control an optically addressable electric field modulator (OAEFM), the OAEFM being responsive to the second wavelength of the second beam, but not the first wavelength of the first beam, and the OAEFM being controlled to generate an electric field in a vicinity of the surface to further control a movement of the portion of material while the portion of material is in the flowable state.

2. The method of claim 1, further comprising using a sensing element to receive a portion of at least one of the first, second or third beams being directed toward the surface.

3. The method of claim 2, further comprising using a processor to receive a feedback signal from the sensing element and to control the generation of the first and second beams.

4. The method of claim 1, wherein using the first beam to control the OALV comprises using the first beam to optically address the OALV, where the OALV is formed by a spaced apart pair of electrodes, and a photoconductor and liquid crystal positioned between the pair of electrodes, and wherein the photoconductor is tuned to a specific wavelength.

5. The method of claim 1, wherein using the second beam to control the OAEFM comprises using the second beam to optically address the OAEFM, and where the OAEFM is formed by a pair of spaced apart electrodes and a photoconductor disposed between the electrodes, the photoconductor being tuned to a specific wavelength.

6. The method of claim 1, further comprising directing the third beam to a polarizing beam splitter, and from the polarizing beam splitter toward the OALV and the OAEFM.

7. The method of claim 1, wherein the first, second and third beams are used repeatedly on a plurality of distinct layers of the material during an additive manufacturing operation.

8. The method of claim 1, wherein the first, second and third beams are used to act on the coating to modify a surface profile of the coating.

9. A method of modifying a surface of a material, in situ, while the material is being used to at least one of form or modify a portion of a part or coating, the method comprising:
using a first optical beam generator to generate a first beam at a first wavelength;
using a second optical beam generator to generate a second beam at a second wavelength different from the first wavelength;
using a third optical beam generator to generate a third beam for acting on a surface of a material to heat a portion of the surface of the material into a flowable state to at least one of ablate a portion of the material, or to modify a surface characteristic of the material, or to heat a portion of the material to achieve stress relaxation;
using the first beam to control an optically addressable light valve (OALV), the OALV being controlled to modify an energy of the third beam in accordance with a first exposure map;
the second beam being generated independently of the first and third beams;
using the second beam to independently control an optically addressable electric field modulator (OAEFM) responsive only to the second beam having the second wavelength, and being located in a path of the first beam but being non-responsive to the first beam, the OAEFM being controlled to generate an electric field in a vicinity of the surface of the material in accordance with a second exposure map, and to help control a movement of the portion of material while the portion of material is in the flowable state; and
using a processor to control the first and second beam generators.

10. The method of claim 9, further comprising using the processor to receive a feedback signal to control at least one of the first, second and third optical beam generators.

11. The method of claim 10, further comprising using a sensing element to receive a reflected portion of the third beam, and using the sensing element to generate the feedback signal to the processor.

12. The method of claim 9, wherein using each of the first, second and third beam generators comprises using first, second and third lasers.

13. A system for modifying a surface of a material, in situ, while the material is being used to at least one of form or modify a portion of a part or coating, the system comprising:
a first beam generator which generates a first optical beam having a first wavelength;
a second beam generator which generates a second optical beam having a second wavelength different from the first wavelength;
a third beam generator which generates a third optical beam for acting on a surface of a material to heat a portion of the surface of the material into a flowable state to modify a surface characteristic of the material;
the second beam being generated independently of the first and third beams;
an optically addressable light valve (OALV) controlled by the first optical beam to modify an energy of the third optical beam; and
an optically addressable electric field modulator (OAEFM) controlled by the second optical beam independently of the first optical beam, and the OAEFM receiving both the first and second beams and being responsive to the second beam with the second wavelength but not to the first beam with the first wavelength, to generate an electric field in a vicinity of the surface and to help control a movement of the portion of material while the portion of material is in the flowable state.

14. The system of claim 13, wherein each of the first, second and third beam generators comprises a laser.

15. The system of claim 13, wherein the OALV comprises:
a pair of spaced apart electrodes;
a photoconductor disposed between the electrodes; and
a liquid crystal disposed between the electrodes.

16. The system of claim 13, wherein the OAEFM comprises:
a single electrode; and
a photoconductor having an input surface, the photoconductor being attached to the single electrode, and the single electrode being at the input surface of the photoconductor.

* * * * *